United States Patent [19]

Ho

[11] Patent Number: 5,794,913

[45] Date of Patent: Aug. 18, 1998

[54] FOOT ASSEMBLY FOR COMPUTER MAINFRAMES

[76] Inventor: Hsin Chien Ho, 20-1F, 268, Sec. 1, Wen-Hua Rd., Pan Chiao City, Taipei, Taiwan

[21] Appl. No.: 772,534

[22] Filed: Dec. 24, 1996

[51] Int. Cl.$^6$ .................................................. F16M 11/00
[52] U.S. Cl. .................................... 248/688; 248/615
[58] Field of Search ............................... 248/688, 677, 248/676, 615, 616, 188.8

[56] References Cited

U.S. PATENT DOCUMENTS

| | | | |
|---|---|---|---|
| 1,830,058 | 11/1931 | Helmond | 248/615 |
| 2,739,774 | 3/1956 | Crede | 248/616 |
| 2,935,280 | 5/1960 | Symonds | 248/615 |
| 4,923,158 | 5/1990 | Saisho | 248/677 |
| 5,344,116 | 9/1994 | Winkler | 248/677 |

*Primary Examiner*—Ramon O. Ramirez
*Assistant Examiner*—Anita M. King
*Attorney, Agent, or Firm*—Bacon & Thomas

[57] ABSTRACT

An assembly for supporting vertical type apparatus such as computer mainframes includes a plurality of inter-linking feet. The feet mounted onto the bottom side of the housing and are rotatable through a certain angle. The feet are provided with respective gears which are engageable to allow symmetrical movement. Each foot is provided with a plurality of elastic elements with protrudent blocks matching corresponding positioning apertures on the bottom side of the housing to effectively support the housing. The feet may be extended to firmly support the housing to prevent it from falling down. They may also be turned to conceal below the housing when not in use so as to facilitate storage and transportation.

3 Claims, 3 Drawing Sheets

FOOT ASSEMBLY FOR COMPUTER MAINFRAMES

BACKGROUND OF THE INVENTION (a) Field of the Invention

The present invention relates to a foot assembly for supporting vertical type apparatus such as vertical computer mainframes to prevent them from falling down when subjected to external forces such as shock.

(b) Description of the Prior Art

Many apparatus such as computer mainframes, stereo speakers or electronic instruments are designed in an elongated vertical type due to factors such as use habits or internal component configurations. Vertical type apparatus may easily fall down and become damaged. Particularly, for computer mainframes accommodating delicate and fragile electronic components and hard disk drives or optical disk drives it is important to prevent them from falling down when bumped against. Recently, shock-proof and fall-resistance are important items in computer safety testings.

In order to prevent vertical type computer mainframes from falling down, manufacturers have developed a boat-shaped foot means with a large recess for receiving and supporting the lower portion of the computer mainframe. However, such a foot structure is bulky, costly and inconvenient to use. There has also developed a rotatable base which may be screwably secured to the bottom of the mainframe. However, its structure is complicated and inconvenient to operate. Besides, since there are generally provided four corner legs which have to be separated closed or extended, it is very inconvenient and the supporting force is not concentrated.

SUMMARY OF THE INVENTION

Accordingly, it is a primary object of the present invention to provide a simple and inexpensive assembly with inter-linking elements for supporting vertical type apparatus such as vertical computer mainframes to prevent them from falling when subjected to an external force so as to protect the internal components.

In order to accomplish the above-mentioned object, the present invention essentially comprises a plurality of foot means. Each foot means comprises a gear at an upper rim and a sleeve serving as an axis. Two contiguous foot means may work in an inter-linking relationship by means of their respective gears which engage each other. The foot means is provided with a plurality of elastic elements having protrudent blocks for engaging corresponding positioning apertures in the bottom side of the housing of a vertical type computer mainframe. The pair of foot means may rotate through the same angle in opposite directions when being extended or closed. The foot means firmly supports the housing and may be turned to conceal below the housing when not in use.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
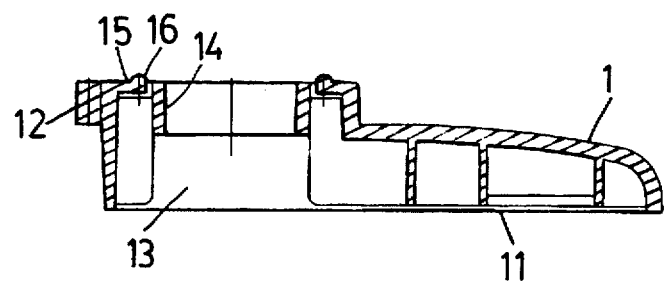
Fig. 1 is a sectional view of an foot means of the present invention.
Figure 2:
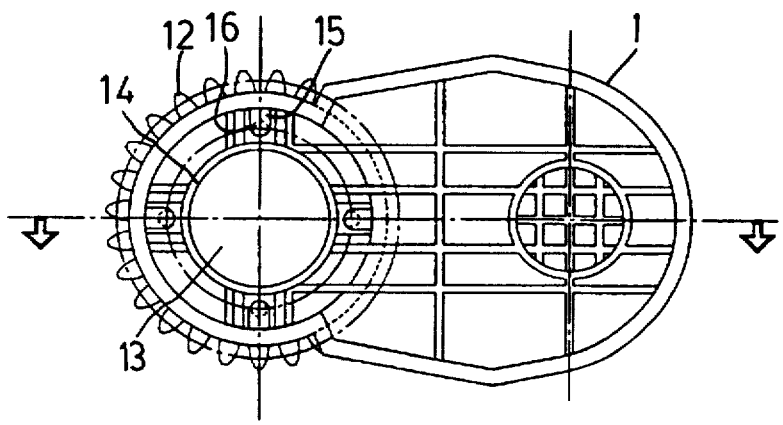
Fig. 2 is a plan view of the foot means of the present invention.
Figures 3, 4:
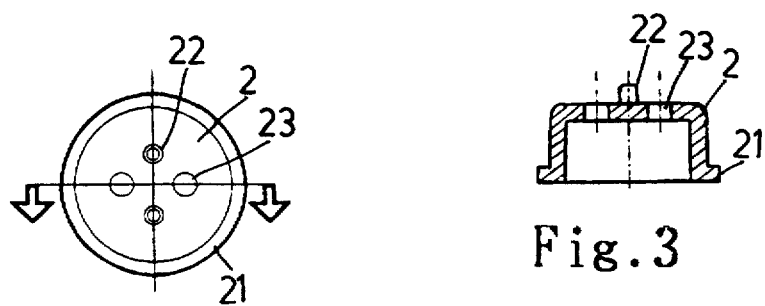
FIG. 3 is a sectional view of the sleeve of the present invention.
FIG. 4 is a plan view of the sleeve of the present invention.

With reference to FIGS. 1 and 2, the foot assembly according to the present invention essentially comprises an inter-linking foot means 1 with a bottom side in the form of a planar plate 11 which is in contact with the floor. A substantially hemispherical gear 12 is disposed at one end of the foot means 1 on the top. A substantially hollow circular hole 13 is disposed in the interior. A circular section 14 is provided on an inner rim of the hollow. A plurality of elastic elements 15 each having a protrudent block 16 are provided at an inner side of the gear 12. A sleeve 2 (see FIGS. 3 and 4) is disposed in the circular hole 13 of the foot means 1. The bottom end of the sleeve 2 is provided with a flange 21. The other end thereof is provided with a positioning block 22 at the center. A plurality of through holes 23 are provided at the outer side of the positioning block 22 at suitable positions. The sleeve 2 may fit into the circular hole 13 of the foot means 1 with its flange 21 abutting the lower rim of the circular section 14 so that they may be coupled together.

Figure 5:
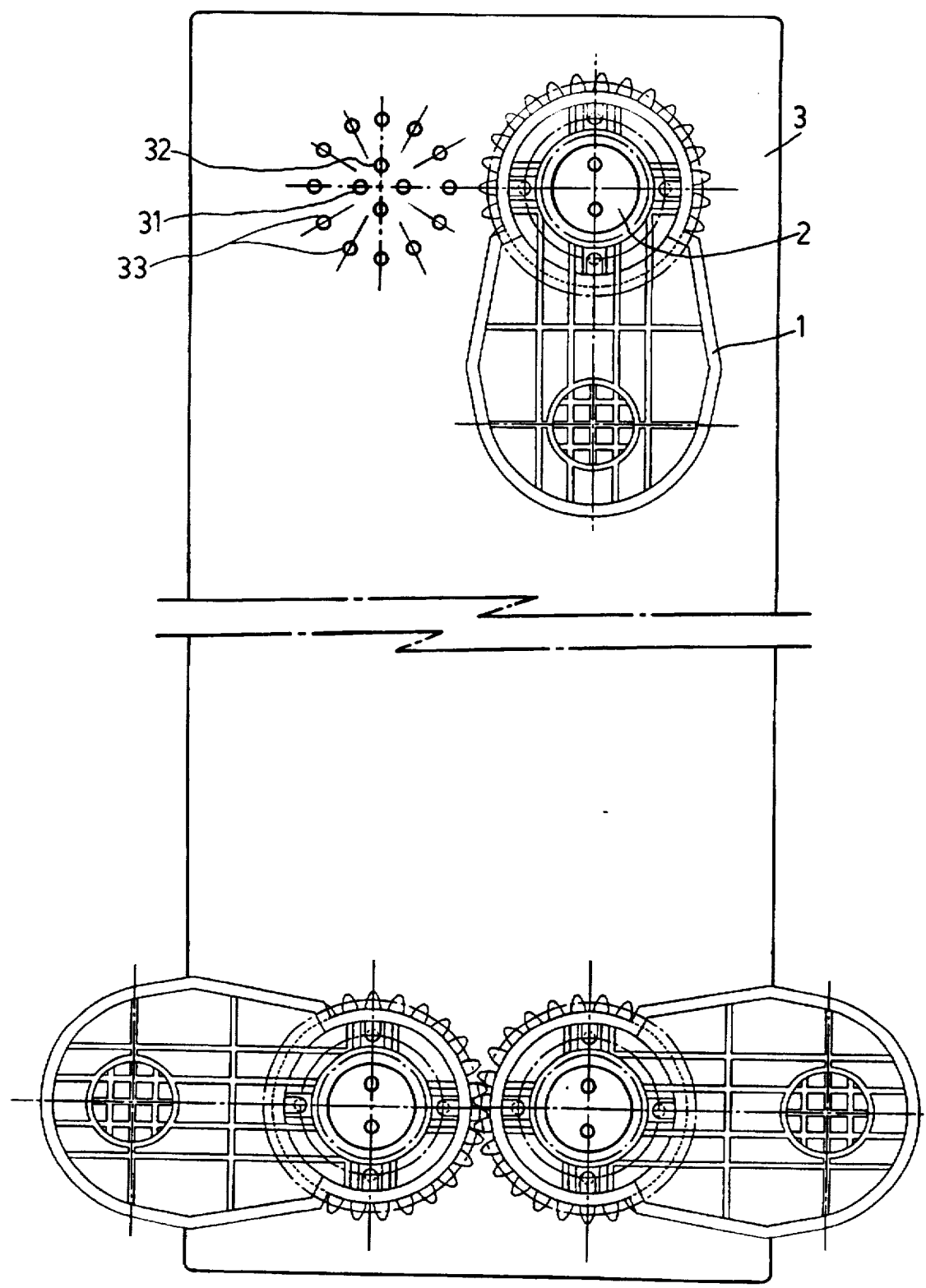
FIG. 5 is a plan view of a preferred embodiment of the foot assembly of the present invention.
Figure 6:
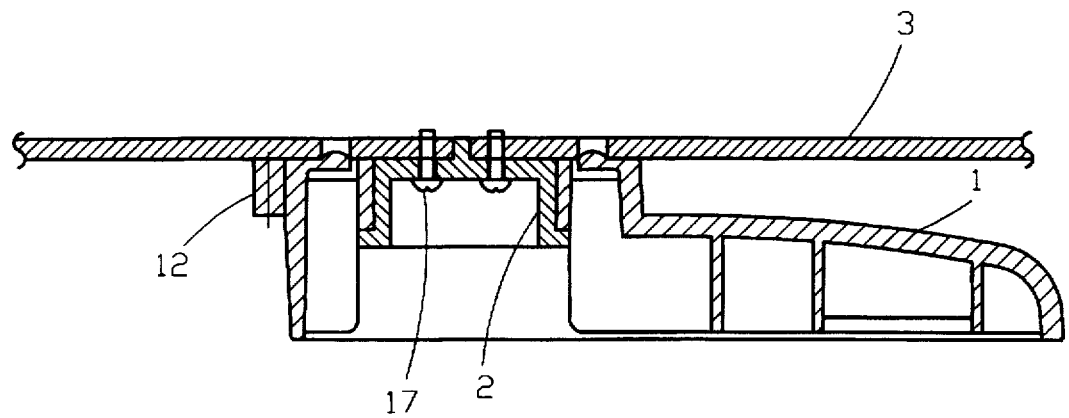
FIG. 6 is a sectional view of the foot assembly of the present invention.

As shown in FIGS. 5 and 6, in reducing the present invention to practice, the metal housing 3 of a computer mainframe (or other vertical type apparatus) is provided with a corresponding positioning hole 31, and a plurality of threaded holes 32 and annularly distributed positioning apertures 33. After the sleeve 2 is joined to the foot means 1, the positioning block 22 on the sleeve 2 is inserted into the positioning hole 31, and a plurality of screws 17 are passed through the through holes 23 of the sleeve 2 into the threaded holes 32 in the housing 3of the computer mainframe so that the foot means 1 is secured to the bottom side of the housing 3 and the protrudent blocks 16 of the elastic elements 15 on the foot means 1 just slide into the positioning apertures 33 of the housing 3. In this way, the foot means 1 may be rotatable.

Two foot means 1 may be arranged in a contiguous relationship such that their gears 12 engage each other so that they may rotate in a linking-up manner. The arrangement of the annularly distributed positioning apertures 33 on the housing 3 is that after the foot means 1 has rotated about a certain angle, the positioning blocks 16 of the elastic elements 15 may slide into the positioning aperture 33 on the housing 3. With reference to FIG. 5, when one of the foot means 1 is rotated, the other foot means 1 will be brought to rotate so that they extend or close synchronously by rotating about the same angle but in opposite directions. The present invention provides linking-up rotation and supporting functions and may enhance the stability of the apparatus to prevent the apparatus from falling down. When not in use, the foot means 1 may be rotatably turned to stay below the housing to facilitate storage and transportation.

Figure 7:
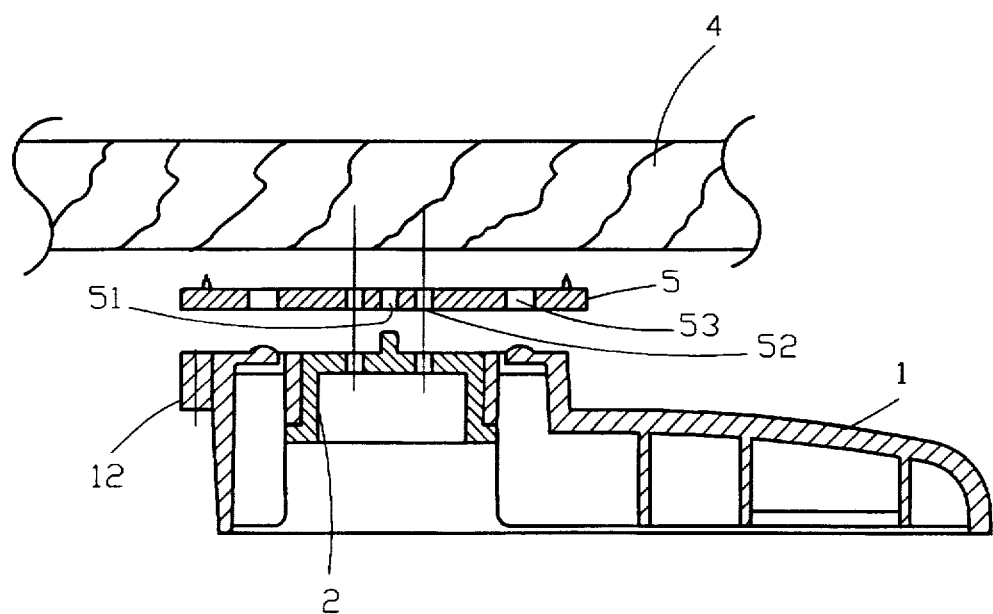
FIG. 7 is a sectional view of another preferred embodiment of the present invention.

The present invention is adapted for use not only with metal housings 3 but also with wooden housings 4, as shown in FIG. 7. It is merely necessary to provide a pad 5 with a positioning hole 51, and a plurality of threaded holes 52 and positioning apertures 53 in order to achieve similar supporting effects.

Although the present invention has been illustrated and described with reference to the preferred embodiment thereof, it should be understood that it is in no way limited to the details of such embodiment but is capable of numerous modifications within the scope of the appended claims.

What is claimed is:

1. A foot assembly for an electrical device housing comprising:

a plurality of feet each of said feet having a planar plate at a bottom side thereof, a gear disposed on a top of one end thereof, and a substantially circular hole at a central portion thereof, with an inner rim extending around the hole, said gear having a plurality of elastic elements each having a protrudent block at an inner side thereof;

a sleeve located in said substantially circular hole in each of said feet, said sleeve having a flange at a bottom end thereof with at least one positioning block at a top end thereof, said at least one positioning block having a plurality of through holes, said sleeve being fitted into said circular hole of each of said feet such that said flange abuts the inner rim of each of said feet; and at least one positioning hole receiving said at least one positioning block of said sleeve, a plurality of threaded holes aligned with said through holes of said sleeve, and a plurality of annularly distributed positioning apertures for engaging said protrudent blocks of said elastic elements located on a bottom side of a housing whereby said at least one positioning block of said sleeve is inserted into said at least one positioning hole and a plurality of screws pass through said through holes of said sleeve into said threaded holes of said housing so that said feet are secured on the bottom side of the housing such that said protrudent blocks of said elastic elements fit into selected ones of the plurality of said positioning apertures to enable said feet to be rotatable relative to the housing, said annularly distributed positioning apertures being located to allow said protrudent blocks of said elastic elements to fit into said positioning apertures after rotating the associated foot about a predetermined angle, whereby said feet may be rotatably turned so as to be concealed under the bottom side of said housing to facilitate storage and transportation.

2. The foot assembly for an electrical device housing as claimed in claim 1, further comprising a pad provided with the at least one positioning hole, the plurality of threaded holes, and the plurality of positioning apertures, the pad being attached to the bottom side of the housing.

3. The foot assembly for an electrical device housing as claimed in claim 1 comprising at least two feet on the bottom side of the housing located such that the gears engage each other such that rotation of one of the at least two feet in a first direction causes rotation of the other of the at least two feet in a second direction opposite to the first direction.

* * * * *